Oct. 27, 1959      R. R. MALARY, JR      2,909,791
SANDWICH CONSTRUCTION FOR SEAPLANE FLOATS
Filed July 19, 1956      2 Sheets-Sheet 1
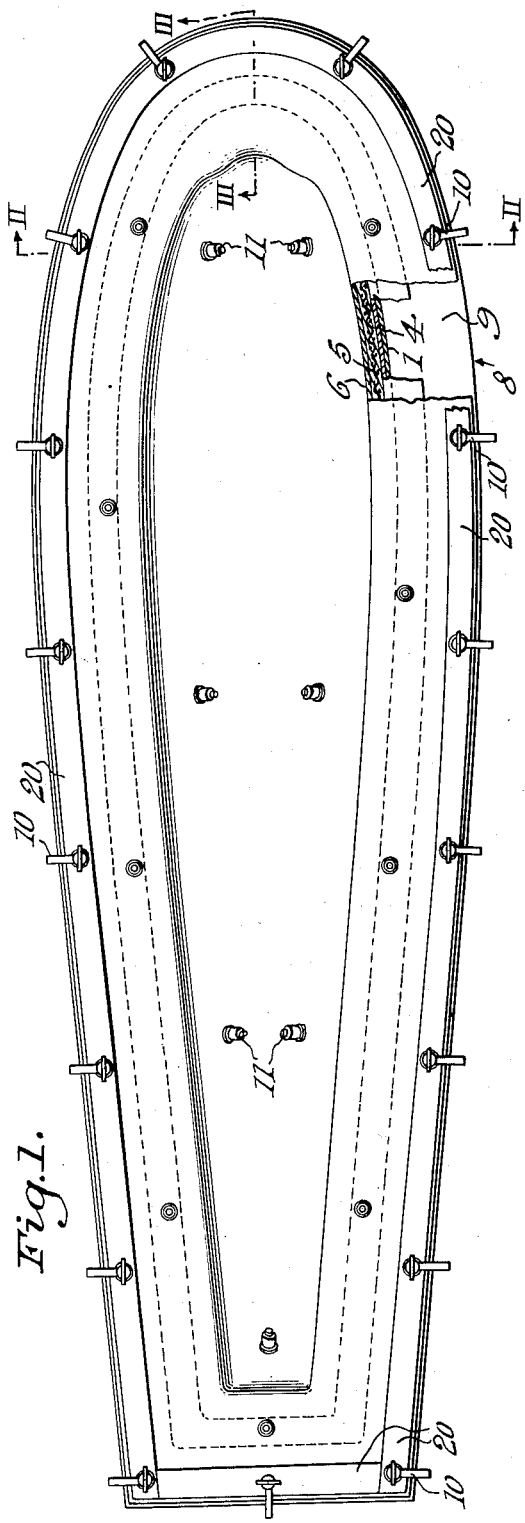
INVENTOR.
Robert R. Malary, Jr.
BY
ATTORNEYS

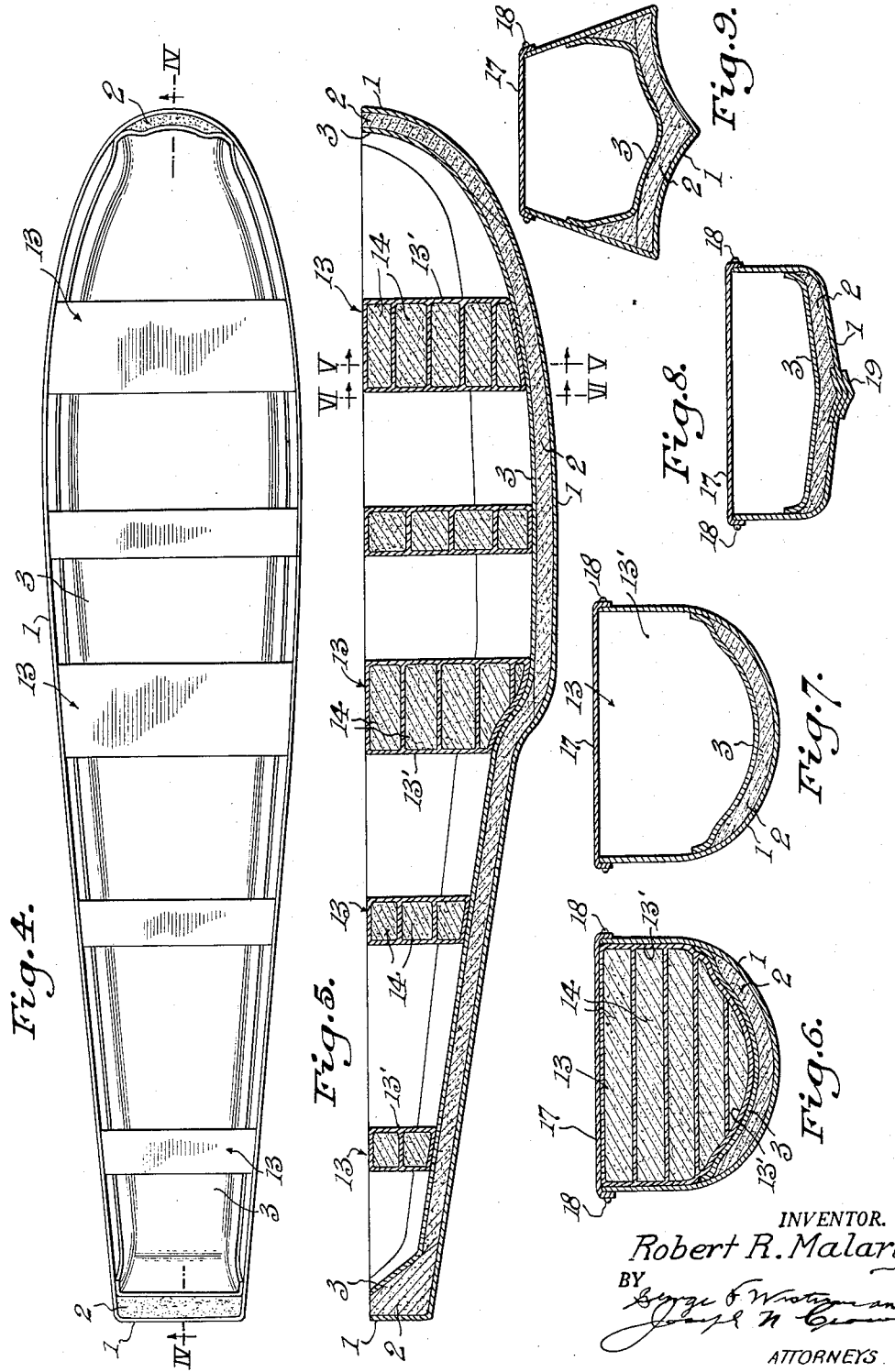

United States Patent Office 2,909,791
Patented Oct. 27, 1959

2,909,791

SANDWICH CONSTRUCTION FOR SEAPLANE FLOATS

Robert R. Malary, Jr., Bellmore, N.Y.

Application July 19, 1956, Serial No. 598,972

1 Claim. (Cl. 9—6)

(Granted under Title 35, U.S. Code (1952), sec. 266)

The invention described herein may be manufactured and used by or for the Government for governmental purposes without the payment of any royalty thereon.

The present invention relates to seaplane pontoons, and more particularly it is directed to a method of producing smooth surfaced laminated plastic seaplane pontoons and the article of manufacture resulting from the practice of such method.

Prior to the present invention, seaplane pontoons were constructed of metal, wood, or non-vacuum formed plastic laminations. Metal pontoons required the use of seams which, under pressure, opened allowing water to penetrate into the pontoon. In addition, metal pontoons were easily dented by contact with rafts, ramps, etc. Pontoons made of wood were subject to corrosion and did not readily retain surface smoothness. In prior laminated plastic pontoons, the laminations were built up on a mold without the use of vacuum so that smooth surfaces and uniform compositions were not attained. In addition, prior laminated plastic pontoons did not include, as internal lamination, sculptured cellular material.

The disadvantages of metal, wood, and previous plastic pontoons have been overcome by the improved method of the present invention and the pontoon thereby produced.

Briefly, in accordance with this invention there is provided a rigid female mold in which are built-up layers of lamination. The bottom layer is fibrous glass, such as glass fabric or glass matting. Over this glass fiber layer, light sculptured core material is placed which is then covered by another layer of glass fabric or matting. The two layers of glass material are saturated with curable resin. Over the top resin-impregnated glass layer is placed a parting agent. Finally, a bleeder layer of loosely woven burlap is placed into the mold and covered by a top layer of cellophane which fits onto the mold to form a vacuum bag. Air is then evacuated, creating pressure upon the laminations and the resin allowed to cure.

From the foregoing, it may be said that the object of this invention is to produce a light-weight pontoon which is waterproof, non-denting under ordinary contacts, relatively low-cost and non-leaking due to seam opening.

Another object of this invention is to provide a pontoon whose surface is relatively smooth and free from irregularities and air bubbles so that water drag is decreased.

A further object of this invention is to provide a pontoon whose walls are light-weight, sufficiently rigid to sustain the pontoon shape, and yet sufficiently flexible so as not to be easily dented.

Other objects and advantages of the invention will be apparent as the description proceeds and the features of novelty will be pointed out with particularity in the appended claim.

The invention will be understood more particularly by reference to the accompanying drawings, in which:

Fig. 1 is a plan view of an assembly consisting of the improved pontoon of the present invention positioned in its forming mold, prior to removal thereof from the mold;

Fig. 2 is a transverse sectional elevation taken adjacent to the right hand end of the assembly as viewed in Fig. 1, and along the line II—II of Fig. 1, looking in the direction of the arrows;

Fig. 3 is a fragmentary sectional elevation through a portion of the right hand end of the assembly as viewed in Fig. 1, the view being generally along the line III—III of Fig. 1, looking in the direction of the arrows;

Fig. 4 is a top plan view of the improved pontoon after its removal from the mold;

Fig. 5 is a longitudinal sectional elevation along the longitudinal center line IV—IV of Fig. 4, looking in the direction of the arrows;

Fig. 6 is a transverse sectional elevation through the pontoon, taken on the line V—V of Fig. 5, looking in the direction of the arrows;

Fig. 7 is a view similar to Fig. 6, but taken on the line VI—VI of Fig. 5, looking in the direction of the arrows;

Fig. 8 is a view similar to Fig. 7, but illustrating a modified construction; and Fig. 9 is a view also similar to Fig. 7, but showing a still further structural modification.

In Fig. 1, the pontoon of the present invention is shown while in the process of being molded within the female mold 8. The cut-away portion of Fig. 1 gives a top view of the laminated construction as it has been built up in the female mold 8. These laminations are the exterior resin-impregnated material 1, the parting layer 4, the breather material 5, and the outer covering layer 6. The outer covering layer is secured so as to be air-tight on the flange 9, which is on the outer circumference of mold 8, by means of clamps 10. This covering 6 is provided with air valves 11, which enables air to be evacuated.

Fig. 2, a partial sectional view along lines II—II of Fig. 1, illustrates the preferred and novel manufacturing method for producing the pontoon of the present invention. The female mold 8 is constructed so that its molding hollow is in the shape of the completed pontoon shell. This mold 8 may be of any conventional material including wood, cement, metal and plaster. It is preferred that this mold have a smooth inner surface. The mold 8 at the top has a flange 9 which extends around its periphery. This flange enables the top covering material 6, preferably cellophane, to be readily and air-tightly secured to the flange 9.

A parting agent such as wax, oil or other lubricant is first applied onto the female mold. Into this female mold is placed glass fabric or glass fiber matting. If fabric is utilized it is preferred to utilize a heavy weave. Material other than glass fiber or mat may also be employed in layers 1 and 3. Such other materials capable of forming suitable plastic material include heavy cotton, including canvas and duck, as well as other cellulose or asbestos fabrics, fibers, and mats. The glass fiber matting or other surface material is then impregnated with a plastic resin. This impregnation may also be accomplished by dipping the glass fiber matting or other suitable material into the resin prior to placement in the female mold. The resin utilized on the exterior 1 and interior 3 layers is preferably of the "cold setting" type due to the difficulty of heat curing with this type of mold. Next a core material 2 is placed in the mold.

It will be noted that preferably the core material 2 does not extend up the sides of the pontoon shell 1 but is primarily shaped around the bottom of the pontoon. Fig. 2 also shows that the outer 1 and inner 3 layers of resin-impregnated glass fiber or matting are joined near the top part of the pontoon shell to form one coherent wall of resin-impregnated glass fiber or matting.

The core material 2 is preferably buoyant and will not readily absorb water in the event the outer plastic layer should be punctured. Suitable core materials include sculptured cellulose acetate, honeycomb material of either plastic or metal, and rigid foam material. Sculptured cellulose acetate is preferred because of its low density, resistance to corrosion, and simplicity of use in molding operations.

Over the core material 2 another layer of resin-impregnated glass fabric or matting 3 is placed. For best adhesion and to better form coherent side walls, the same resin should be used in layers 1 and 3. Covering the resin-impregnated layers 1 and 3, a parting material 4 is next placed in the female mold 8. This parting material 4 is preferably of cellophane. A bleeder layer 5 of burlap or other loosely woven material is next placed in the female mold 8 co-extensive with the parting layer 4. The function of this bleeder layer 5 is to allow air to be withdrawn, forming a vacuum over the entire inner surface of the female mold. The top layer of air-tight material 6, preferably cellophane, is next inserted into the mold. This top cover 6 extends over the resin-impregnated layers 1 and 3 as well as the parting layer 4 and the bleeder material 5. This top air-tight layer 6 is sufficiently large so as to extend over the flange 9 of the female mold 8. This air-tight cover 6 is provided with air vents or valves 11 so that air may be withdrawn. The air-tight cover 6 is secured so as not to allow air leakage by fastening it to the flange 9 by means of clamps 10 and wood strips 20. The air is evacuated by means of the air vents or valves 11. A partial vacuum is formed which exerts pressure between the air-tight cover 6 and the female mold 8. This pressure causes the resin-impregnated layers 1 and 3, and the core material 2, to become a coherent whole. It is by these means that one of the main features of the present invention is attained. The exterior surface of the pontoon float is formed smooth and relatively free of air bubbles. A rough surface, or a surface with air bubbles will have greater drag and water resistance than a smooth surfaced pontoon float. This is important at the high speeds at which sea planes take off and land. Curing of the pontoon float without pressure results in a rough and wrinkled surface with air bubbles and lacking in internal cohesion. Curing by means of male and female mold pressure is more expensive due to the added expense of the male mold and associated apparatus.

Fig. 3, a partial sectional view along lines III—III of Fig. 1, shows the forward part of the preferred pontoon construction. The core material 2 extends, at the front of the pontoon, to the top surface. The pontoon front and rear are the parts most likely to come into contact with objects with resultant damage to the pontoon construction. Extra reinforcement and thickness at these points is therefore afforded by extending the core material 2 further up the pontoon walls, than at the sides of the pontoon.

Fig. 4 is a top plan view of the completed pontoon float without the cover plate. The forward and rearward core materials 2 are shown as extending up to the top of the pontoon. Bulkheads 13 are provided which, upon closing the pontoon float cover, give distinct waterproof compartments. It is preferred that the bulkheads be also constructed of the resin-impregnated laminated glass fiber with core material of the present invention. The bulkhead 13 is shown as so constructed, with resin-impregnated glass fiber 13' surrounding sculptured cellulose core material 14. This construction of the bulkheads 13 lessens damage by denting and breaking due to operation of the bilge pumps. In addition, the plastic laminated bulkheads being of the same material as the pontoon shell material 1 and 3, are readily adherent to it.

Fig. 6, a partial sectional view through V—V of Fig. 5, shows the preferred bulkheads in place. The resin-impregnated glass fiber walls 13' and core material 14 are shaped to conform to the inner shape of the pontoon so that the compartments are watertight. The pontoon float cover 17 is preferably of resin-impregnated glass fiber so as to be strong, light-weight, flexible, and readily adherent to the rest of the pontoon float. The pontoon float cover 17 may be attached to the pontoon float shell by, for example, adhesive, screws, or detachable fastening means. Corrosion resistant self-tapping screws 18 have been found satisfactory for this purpose.

Fig. 7 is a partial side sectional view along lines VI—VI of Fig. 5. The core material 2 is shown as primarily positioned at the bottom of the pontoon float shell.

Figs. 8 and 9 are side elevations of two alternative designs for pontoon floats. In Fig. 8 a skid keel construction is shown at 19. This skid keel is preferably of an abrasion resistant metal.

Having thus described my invention, what I claim as new and wish to secure by Letters Patent is:

A pontoon float comprising a unitary hull of laminated construction, said hull including outer and inner surface layers of resin-impregnated fibrous material, the outer surface layer being substantially free of air bubbles and surface roughness, and a central layer of buoyant core material, the inner surface and the buoyant core material being positioned substantially at the bottom, front, and rear portions of said hull, a pluraliy of spaced watertight bulkheads fitted transversely of the longitudinal axis of said hull, said bulkheads comprising cellular structures of laminated resin-impregnated fibrous material filled with buoyant core material, and a resin-impregnated fibrous material fitted cover for said hull.

References Cited in the file of this patent

UNITED STATES PATENTS

| | | |
|---|---|---|
| 2,088,352 | Vierkotter | July 27, 1937 |
| 2,381,631 | Waring | Aug. 7, 1945 |
| 2,414,125 | Rheinfrank | Jan. 14, 1947 |
| 2,417,586 | Crosley | Mar. 18, 1947 |
| 2,478,165 | Collins | Aug. 2, 1949 |
| 2,547,146 | Anthony | Apr. 3, 1951 |
| 2,617,126 | Nebesar | Nov. 11, 1952 |
| 2,805,974 | Brucker | Sept. 10, 1957 |
| 2,815,309 | DeGanahl et al. | Dec. 3, 1957 |